United States Patent
Gottschalk et al.

(10) Patent No.: US 8,555,862 B2
(45) Date of Patent: Oct. 15, 2013

(54) APPARATUS FOR TANK VENTILATION

(75) Inventors: Wolfram Gottschalk, Magdeburg (DE);
Olaf Magnor, Braunschweig (DE);
Daniel Reitebuch, Berlin (DE);
Franziska Schulz, Rostock (DE)

(73) Assignee: IAV GmbH Ingenieurgesellschaft Auto und Verkehr, Berlin (DE)

( * ) Notice: Subject to any disclaimer, the term of this patent is extended or adjusted under 35 U.S.C. 154(b) by 408 days.

(21) Appl. No.: 12/737,002

(22) PCT Filed: Jan. 27, 2010

(86) PCT No.: PCT/DE2010/000092
§ 371 (c)(1),
(2), (4) Date: Nov. 30, 2010

(87) PCT Pub. No.: WO2010/097067
PCT Pub. Date: Sep. 2, 2010

(65) Prior Publication Data
US 2011/0076936 A1   Mar. 31, 2011

(30) Foreign Application Priority Data
Feb. 25, 2009  (DE) .................. 10 2009 011 155

(51) Int. Cl.
*F02M 35/10* (2006.01)
*F02M 35/104* (2006.01)

(52) U.S. Cl.
USPC .......................................... 123/519; 123/520

(58) Field of Classification Search
USPC ............. 123/519, 520, 521, 518, 516, 559.1, 123/559.2, 562, 565; 701/108; 60/283, 284, 60/289, 307
See application file for complete search history.

(56) References Cited

U.S. PATENT DOCUMENTS

| 5,005,550 | A | * | 4/1991 | Bugin et al. | 123/520 |
| 5,183,023 | A | * | 2/1993 | Hanson | 123/520 |
| 5,269,278 | A | * | 12/1993 | Heinemann et al. | 123/520 |
| 5,918,580 | A |   | 7/1999 | Hennrich et al. | |
| 5,979,418 | A | * | 11/1999 | Saruwatari et al. | 123/519 |
| 6,014,958 | A |   | 1/2000 | Miwa et al. | |
| 6,138,644 | A |   | 10/2000 | Saruwatari et al. | |
| 7,284,541 | B1 | * | 10/2007 | Uchida | 123/520 |

FOREIGN PATENT DOCUMENTS

| DE | 196 45 382 | 5/1998 |
| DE | 198 56 842 | 6/1999 |
| EP | 0 840 002 | 5/1998 |
| JP | 2007-278094 | 10/2007 |

OTHER PUBLICATIONS

International Search Report.

* cited by examiner

*Primary Examiner* — Mahmoud Gimie
(74) *Attorney, Agent, or Firm* — Collard & Roe, P.C.

(57) ABSTRACT

A system provides reliable tank ventilation, particularly in the case of supercharged internal combustion engines, while also assuring efficient operation of the internal combustion engine. A tank is connected with an adsorption filter by way of a first tank ventilation line. The adsorption filter is connected with the intake line of the internal combustion engine by way of a second tank ventilation line. A drive apparatus includes a turbine wheel and a pump wheel coupled with one another. The pump wheel is disposed in the second tank ventilation line. The turbine wheel is disposed in a bridging line branching off from the intake line and flowing into the intake line. The bridging line branches off from the intake line downstream from a compressor disposed in the intake line.

8 Claims, 2 Drawing Sheets

APPARATUS FOR TANK VENTILATION

CROSS REFERENCE TO RELATED APPLICATIONS

Figure 1:
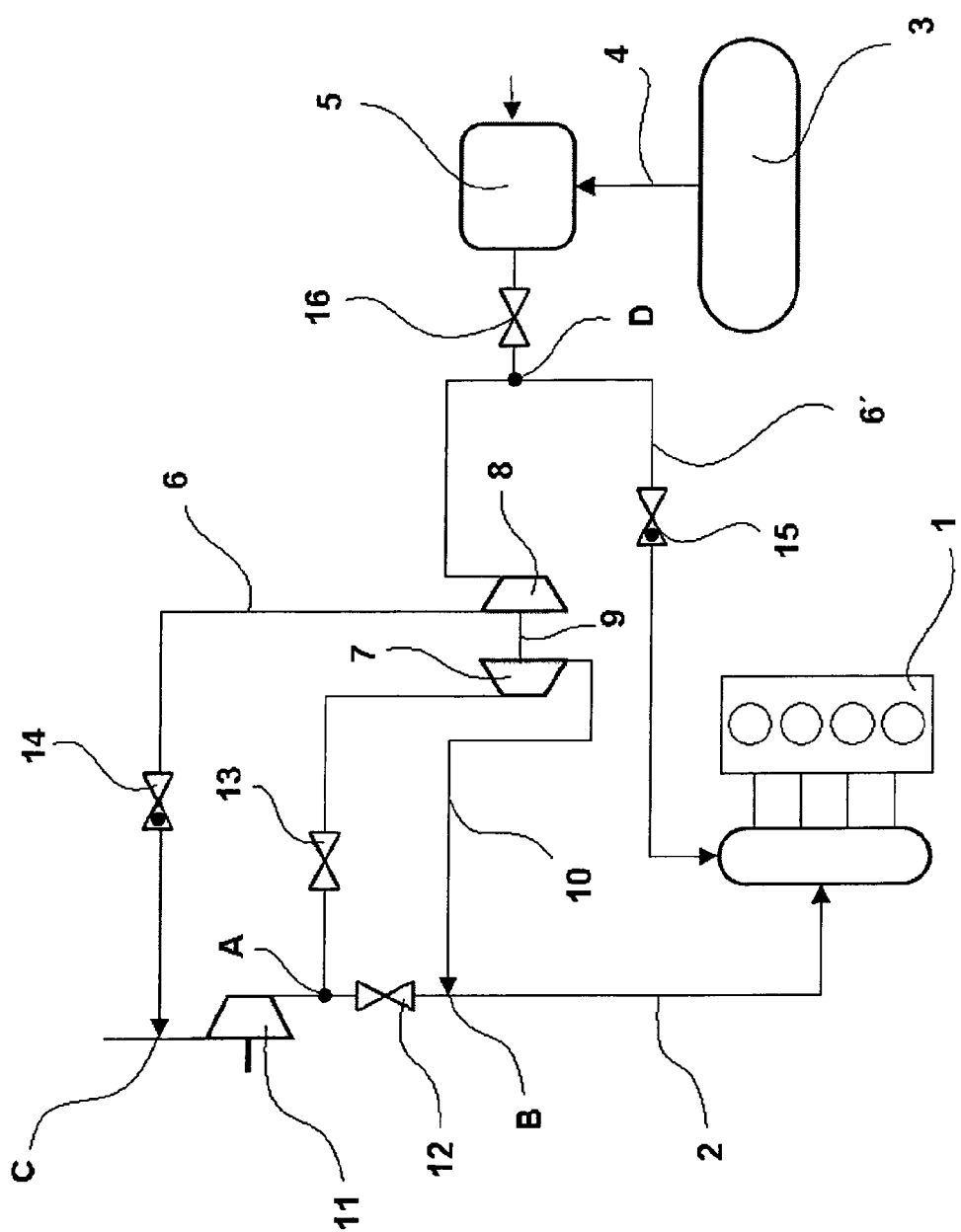

This application is the National Stage of PCT/DE2010/000092 filed on Jan. 27, 2010, which claims priority under 35 U.S.C. §119 of German Application No. 10 2009 011 155.7 filed on Feb. 25, 2009, the disclosure of which is incorporated by reference. The international application under PCT article 21(2) was not published in English.

The present invention relates to an apparatus or system for tank ventilation.

An apparatus for tank ventilation for a vehicle having an internal combustion engine is previously known from DE19645382C2. This apparatus comprises a first tank ventilation line for connecting a tank with an adsorption filter. Furthermore, a second tank ventilation line that is connected with the adsorption filter and flows into an intake line of the internal combustion engine in the region of the throttle valve and has a tank ventilation valve suitable for mass flow modulation is provided. A drive apparatus is disposed downstream from the tank ventilation valve between the intake line and a line section of the second tank ventilation line that runs parallel to the intake line. The drive apparatus comprises a turbine wheel that is disposed in the intake line and a pump wheel that is coupled with the turbine wheel by way of a common shaft and is disposed on the second tank ventilation line. During operation of the internal combustion engine, the turbine wheel and therefore the pump wheel are driven by means of the mass flow that flows through the intake line, so that even if the throttle valve disposed in the intake line is completely open, tank ventilation or regeneration of the adsorption filter, respectively, can take place.

It is the task of the present invention to further expand this state of the art, in such a manner that reliable tank ventilation is assured, particularly in the case of supercharged internal combustion engines, while also assuring the most efficient operation possible of the underlying internal combustion engine.

This task is accomplished, according to the invention, by means of an apparatus for tank ventilation, whereby a tank is connected with an adsorption filter by way of a first tank ventilation line, whereby the adsorption filter is connected with the intake line of an internal combustion engine by way of a second tank ventilation line, whereby a drive apparatus is provided, which comprises a turbine wheel and a pump wheel, whereby the pump wheel and the turbine wheel are coupled with one another by way of a common shaft, whereby the pump wheel is disposed in the second tank ventilation line, whereby the turbine wheel is disposed in a bridging line, whereby the bridging line not only branches off from the intake line but also flows into the intake line, whereby the bridging line branches off from the intake line downstream from a compressor of a supercharging unit disposed in the intake line. It is advantageous, according to the invention, due to the fact that a bridging line is provided, in which the turbine wheel for driving the pump wheel is disposed, in comparison with the known state of the art, that the flow of the gas masses that flow to the internal combustion engine is not disrupted by a turbine wheel that is permanently disposed in the intake line, which is driven even when no tank ventilation/regeneration of the adsorption filter is required. In other words, the case of operation can occur where tank ventilation or regeneration, respectively, is not necessary, but maximum torque is demanded from the internal combustion engine, so that drive of the pump wheel and not insignificant disruption of the flow of the gas masses that flow to the internal combustion engine occurs unnecessarily. Fundamentally, a resistance connected with the disruption of this flow or a filling loss of the internal combustion engine, respectively, can be compensated again by means of a supercharging device, such as an exhaust gas turbocharger of a mechanically driven supercharging unit, having a compressor in the intake line of the internal combustion engine, but at the expense of the overall degree of efficiency of the combination of supercharging device and internal combustion engine. Furthermore, as is provided in an embodiment of the present invention, a flow by way of the turbine wheel can either be stopped completely, or can be adapted, continuously or in steps, to the requirements that might be made, in each instance, on the part of the tank ventilation or the regeneration of the adsorption filter, respectively, by means of a valve that is disposed in the bridging line upstream from the turbine wheel of the drive apparatus. According to the invention, in an embodiment, the bridging line can branch off downstream from a compressor disposed in the intake line and upstream from a throttle valve disposed in the intake line, and flow into the intake line again downstream from the throttle valve. In this embodiment, the gas mass stream that flows to the internal combustion engine is divided into two partial streams, namely a first partial stream by way of the throttle valve and a second partial stream by way of the turbine wheel in the bridging line. Assuming that the requirement of undertaking tank ventilation or regeneration of the adsorption filter, respectively, is present, and the internal combustion engine is being operated in an operating point at which the throttle valve is only partly open, then the gas mass stream can be diverted by way of the turbine wheel, in advantageous manner, according to the invention, by opening the valve in the bridging line and closing the throttle valve, whereby the pump wheel is driven and in this manner, the losses due to throttling of the gas masses that flow to the internal combustion engine that occur in any case can be utilized for active tank ventilation. In another embodiment of the invention, it is provided that the bridging line branches off downstream from a compressor disposed in the intake line and upstream from a throttle valve disposed in the intake line, and flows into the intake line again upstream from the compressor.

All the arrangements of the bridging line that have been listed should preferably be carried out in connection with existing systems for tank ventilation/regeneration of the adsorption filter, which systems are based solely on an operation-point-dependent sufficient pressure gradient between the intake system downstream from a throttle valve and the tank/adsorption container, so that an increase in the load change work to be applied, as it occurs, in each instance, is held within limits, by means of the at least partial closing of the throttle valve or by means of detuning of the operating point of the supercharging device/compressor in the intake system, respectively.

Other advantageous embodiments of the present invention can be derived from the following exemplary embodiment as well as the appended claims.

Figure 2:
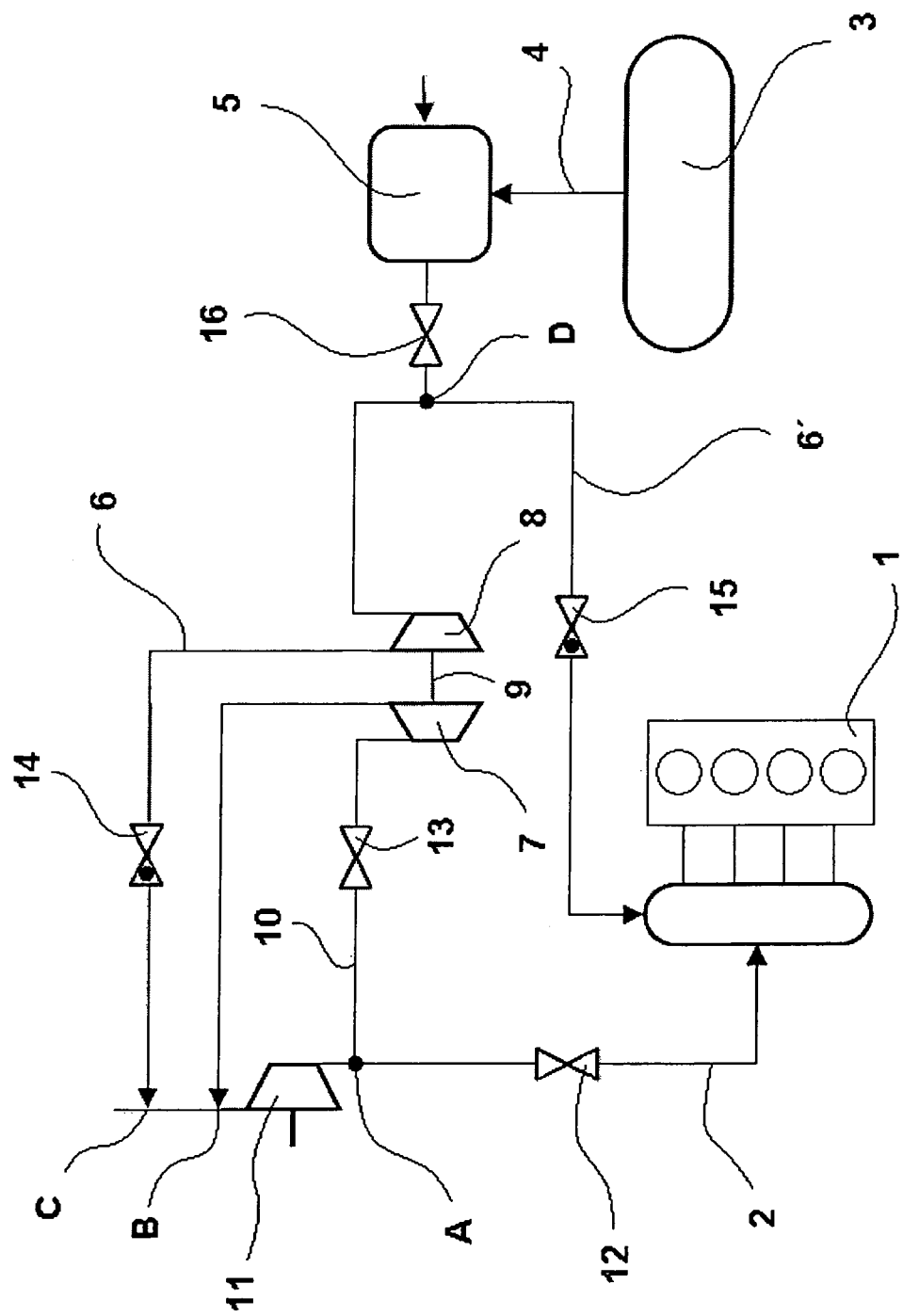

In this connection, the drawing shows:

FIG. 1: a schematic representation of a first embodiment of the apparatus according to the invention, FIG. 2: a schematic representation of another embodiment of the apparatus according to the invention.

According to FIG. 1, for a first embodiment of the present invention, a generally known internal combustion engine 1 is shown, with an intake line 2, a tank 3, a first tank ventilation line 4, an adsorption filter 5, and a second tank ventilation line 6. Furthermore, a drive apparatus is shown, which comprises a turbine wheel 7 and a pump wheel 8, which are coupled with one another by way of a common shaft 9. The pump wheel 8 is disposed in the second tank ventilation line 6, and the turbine wheel 7 is disposed in a bridging line 10. The bridging line 10 branches off from the intake line 2 at point A, downstream from a compressor 11 of a supercharging device, not shown in any detail, for example an exhaust gas turbocharger, disposed in the intake line 2, and flows back into the intake line 2 at point B. The bridging line 10 therefore branches off from the intake line 2 downstream from the compressor 11 disposed in the intake line 2 and upstream from a throttle valve 12 disposed in the intake line 2, and flows back into the intake line 2 downstream from the throttle valve 12. In the bridging line 10, a valve 13 is disposed upstream from the turbine wheel 7. The second tank ventilation line 6 flows into the intake line 2 upstream from the compressor 11 at point C. In the second tank ventilation line 6, a valve 14 is disposed downstream from the pump wheel 8, which valve is preferably configured as a kick-back valve, which opens in the direction of the intake line 2. In the second tank ventilation line 6, a branch D is furthermore present, from which an additional part of the second tank ventilation line 6' branches off, which flows into the intake line 2 downstream from the throttle valve 12. In the additional part of the second tank ventilation line 6', a valve 15 is disposed, which is preferably configured as a kick-back valve that opens in the direction of the intake line 2.

This additional part of the second tank ventilation line 6' corresponds to the system generally known from the state of the art for tank ventilation/regeneration of the adsorption filter 5, which only guarantees reliable and efficient tank ventilation if a sufficient pressure gradient is present between the intake line 2 downstream from the throttle valve 12 and the adsorption filter 5, or the surroundings, respectively. In other words, FIG. 1 shows the preferred combination of such a known system with the apparatus according to the invention that is to be used. In the second tank ventilation line 6, another valve 16 is furthermore disposed downstream from the adsorption filter 5 and upstream from the pump wheel 8. During operation of the internal combustion engine 1 or, respectively, during operation of a vehicle, not shown in any detail, that comprises an apparatus according to the present invention, fuel vapors that form in the tank 3 are passed to the adsorption filter 5 by way of the first tank ventilation line 4, and embedded there. When regeneration of the adsorption filter 5 is demanded, the valve 16 is opened. If the throttle valve 12 is only partly open and if a sufficient pressure gradient prevails between the intake line 2 and the adsorption filter 5, the valve 15, which is structured as a kick-back valve that opens toward the intake line 2, opens, and a gas mass stream flows from the adsorption filter 5, by way of the second tank ventilation line 6 and the additional part of the second tank ventilation line 6', to the intake line 2, and thus to the internal combustion engine 1. However, if no such sufficient pressure gradient is present, for example because the internal combustion engine 1 is working under a great load and the throttle valve 12 is wide open, and the adsorption filter 5 has to be regenerated, for example because there are high ambient temperatures and a lot of fuel is evaporated in the tank 3, then according to the invention, the valve 13 upstream from the turbine wheel 7 in the bridging line 10 can be opened, and the throttle valve 12 can be closed by a certain amount, so that a gas mass stream by way of the turbine wheel 7 forms, and the pump wheel 8 is driven, so that a pressure gradient builds up between the adsorption filter 5, by way of the second tank ventilation line 6, and the valve 14 that is opening toward the intake line 2, upstream from the compressor 11, and the adsorption filter 5 is regenerated, whereby the valve 15 in the additional part of the second tank ventilation line 6' is closed, as the result of the relatively low pressure in the second tank ventilation line 6 or the additional part of the second tank ventilation line 6', respectively. The gas mass stream that forms due to the regeneration of the adsorption filter 5 is passed back to the intake line 2 again at point C, whereby the compressor 11, which is disposed downstream in the intake line 2 with reference to point C, conveys this gas mass stream in the direction of the internal combustion engine 1, so that the fuel vapors are reacted in the internal combustion engine 1, without being given off into the environment.

According to FIG. 2, another embodiment of the present invention is shown, which demonstrates differences only with regard to the course of the bridging line 10 in comparison with FIG. 1. According to this embodiment, the bridging line 10 branches off from the intake line 2 downstream from the compressor 11 disposed in the intake line 2 and upstream from the throttle valve 12 disposed in the intake line 2, at point A, and flows back into the intake line 2 upstream from the compressor 11, at point B. As a result, a gas mass stream by way of the turbine wheel 7 forms when the valve 13 in the bridging line 10 is opened, particularly for the case that tank ventilation/regeneration of the adsorption filter 5 is demanded, and the pump wheel 8 is driven, so that active tank ventilation/regeneration of the adsorption filter 5 can take place.

In the case of the two embodiments mentioned, according to FIG. 1 and FIG. 2, it is possible, according to the invention, independently, not only to vary either the timing or the effective cross-section of the valve 16 in order to adjust the gas mass stream for regeneration of the adsorption filter 5, but also to vary the power of the turbine wheel 7, by influencing either the timing or the effective cross-section of the valve 13. Likewise, timing or adaptation of the effective cross-section of the valve 13 and of the valve 16 can take place at the same time.

REFERENCE SYMBOLS 1 internal combustion engine
2 intake line
3 tank
4 first tank ventilation line
5 adsorption filter
6 second tank ventilation line
6' additional part of the second tank ventilation line 6
7 turbine wheel
8 pump wheel
9 shaft
10 bridging line
11 compressor
12 throttle valve
13 valve
14 valve
15 valve
16 valve
A branch
B junction
C junction
D branch

The invention claimed is:
1. A system for tank ventilation, the system comprising:
    a tank,
    an adsorption filter connected to the tank,
    a first tank ventilation line connecting the adsorption filter to the tank, an internal combustion engine having an intake line and connected with the adsorption filter, a second tank ventilation line connecting the intake line of the internal combustion engine and the adsorption filter, a drive apparatus comprising a turbine wheel and a pump wheel coupled with one another, the pump wheel being disposed in the second tank ventilation line, a bridging line, the turbine wheel being disposed in the bridging line, and the bridging line not only branching off from the intake line but also flowing into the intake line, and a compressor disposed in the intake line, the bridging line branching off from the intake line downstream from the compressor.

2. The system according to claim 1, further comprising a throttle valve disposed in the intake line, wherein the bridging line branches off upstream from the throttle valve and flows back into the intake line downstream from the throttle valve.

3. The system according to claim 1, further comprising a throttle valve disposed in the intake line, wherein the bridging line branches off downstream from the compressor and upstream from the throttle valve and flows back into the intake line upstream from the compressor.

4. The system according to claim 2, wherein the second tank ventilation line flows into the intake line upstream from the compressor.

5. The system according to claim 1, further comprising a valve disposed in the bridging line upstream from the turbine wheel of the drive apparatus.

6. The system according to claim 1, further comprising a throttle valve disposed in the intake line, further comprising a second valve and a third valve, wherein the second tank ventilation line has a branch upstream from the pump wheel of the drive apparatus and has an additional part proceeding from the branch, wherein the additional part of the second tank ventilation line flows into the intake line downstream from the throttle valve, wherein the second valve is disposed in the additional part of the second tank ventilation line, and wherein the third valve is disposed in the second tank ventilation line downstream from the branch and downstream from the pump wheel.

7. The system according to claim 6, wherein the second valve and the third valve are kick-back valves that open in the direction of the intake line.

8. The system according to claim 6, further comprising a fourth valve, the fourth valve being disposed in the second tank ventilation line upstream from the branch.

* * * * *